United States Patent
Cestaro et al.

(10) Patent No.: US 12,492,713 B2
(45) Date of Patent: Dec. 9, 2025

(54) PUMP COVER FOR A HOUSEHOLD APPLIANCE

(71) Applicant: I.R.C.A. S.P.A. INDUSTRIA RESISTENZE CORAZZATE E AFFINI, Vittorio Veneto (IT)

(72) Inventors: Gianluca Cestaro, Mira (IT); Antonio De Moliner, Oderzo (IT); Damiano Montagner, Codognè (IT); Federico Zoppas, Treviso (IT)

(73) Assignee: I.R.C.A. S.P.A. INDUSTRIA RESISTENZE

( * ) Notice: Subject to any disclaimer, the term of this patent is extended or adjusted under 35 U.S.C. 154(b) by 706 days.

(21) Appl. No.: 17/906,530

(22) PCT Filed: Mar. 24, 2021

(86) PCT No.: PCT/IB2021/052422
§ 371 (c)(1),
(2) Date: Sep. 16, 2022

(87) PCT Pub. No.: WO2021/191809
PCT Pub. Date: Sep. 30, 2021

(65) Prior Publication Data
US 2023/0122647 A1    Apr. 20, 2023

(30) Foreign Application Priority Data
Mar. 25, 2020   (IT) .................. 102020000006253

(51) Int. Cl.
*A47L 15/42*   (2006.01)
*D06F 34/24*   (2020.01)
(Continued)

(52) U.S. Cl.
CPC ........ *F04D 29/588* (2013.01); *A47L 15/4225* (2013.01); *A47L 15/4285* (2013.01);
(Continued)

(58) Field of Classification Search
None
See application file for complete search history.

(56) References Cited

U.S. PATENT DOCUMENTS 5,058,197 A * 10/1991 Honkomp ............... F24H 1/202
  392/455
5,117,089 A *  5/1992 Honkomp ................ H05B 3/82
  219/505
(Continued)

FOREIGN PATENT DOCUMENTS

DE         10062540 A1    6/2002
DE    102004060949 A1 *  2/2006  ........... F24H 9/2028
(Continued)

OTHER PUBLICATIONS

Patent Cooperation Treaty, International Search Report and Written Opinion for International Application No. PCT/IB2021/052422, mailed Jul. 28, 2021, 13 pages.

*Primary Examiner* — Thor S Campbell
(74) *Attorney, Agent, or Firm* — Stetina Garred Brucker & Newboles (57) ABSTRACT

A cover for a pump for a liquid for a household appliance, in particular for a dishwasher or a washing machine;
the cover comprising
an electric heating element partially in contact with the wall, which crosses said wall, whereby said at least one electric heating element is apt to come into contact with the liquid;
the cover further comprising at least two NTC thermistors which are fixed to the outer face by a support provided with a notch;
wherein the two NTC thermistors are at a stretch of heating element separated by the wall, and are fixed to zones of the support between which said notch is provided.

13 Claims, 5 Drawing Sheets

(51) Int. Cl.
  *D06F 39/04*    (2006.01)
  *D06F 39/08*    (2006.01)
  *F04D 1/00*     (2006.01)
  *F04D 29/42*    (2006.01)
  *F04D 29/58*    (2006.01)
  *F24H 1/10*     (2022.01)
  *G05D 23/24*    (2006.01)
  *H05B 3/82*     (2006.01)
  *D06F 103/16*   (2020.01)
  *D06F 103/52*   (2020.01)

(52) U.S. Cl.
  CPC .......... *A47L 15/4287* (2013.01); *D06F 34/24* (2020.02); *D06F 39/04* (2013.01); *D06F 39/085* (2013.01); *F04D 1/00* (2013.01); *F04D 29/426* (2013.01); *F24H 1/102* (2013.01); *G05D 23/24* (2013.01); *H05B 3/82* (2013.01); *A47L 2401/12* (2013.01); *D06F 2103/16* (2020.02); *D06F 2103/52* (2020.02); *F24H 2250/02* (2013.01); *H05B 2203/016* (2013.01)

(56) References Cited

U.S. PATENT DOCUMENTS

| | | | |
|---|---|---|---|
| 5,257,341 A * | 10/1993 | Austin, Jr. | F24H 1/142 |
| | | | 433/32 |
| 5,560,060 A * | 10/1996 | Dausch | A47L 15/0044 |
| | | | 68/12.22 |
| 5,635,092 A * | 6/1997 | O'Neil | H05B 1/0213 |
| | | | 219/441 |
| 5,706,390 A * | 1/1998 | O'Neil | H05B 3/82 |
| | | | 392/501 |
| 6,064,801 A * | 5/2000 | Stokes | F24H 9/1818 |
| | | | 392/501 |
| 6,282,372 B1 * | 8/2001 | Boros | F24H 15/223 |
| | | | 392/501 |
| 6,611,660 B1 * | 8/2003 | Sagal | H05B 3/48 |
| | | | 392/503 |
| 6,915,069 B2 * | 7/2005 | Bradenbaugh | G01J 5/0037 |
| | | | 374/E1.021 |
| 8,150,246 B1 * | 4/2012 | Bolivar | F24H 1/102 |
| | | | 392/500 |
| 10,724,547 B2 * | 7/2020 | Zoppas | A47L 15/4225 |
| 2007/0137599 A1 * | 6/2007 | Preiholt | F02N 19/10 |
| | | | 123/142.5 E |
| 2008/0044168 A1 * | 2/2008 | Eichholz | F04D 29/426 |
| | | | 415/121.3 |
| 2009/0047008 A1 * | 2/2009 | Straley | A01K 63/065 |
| | | | 392/503 |
| 2015/0251519 A1 * | 9/2015 | Leborgne | B60H 1/2221 |
| | | | 392/491 |
| 2018/0328366 A1 * | 11/2018 | Laing | F04D 15/0218 |
| 2020/0080749 A1 * | 3/2020 | Hackl | F24H 1/08 |
| 2022/0015451 A1 * | 1/2022 | Walker | G05D 23/24 |
| 2022/0178582 A1 * | 6/2022 | Höfer | F24H 9/146 |
| 2022/0297130 A1 * | 9/2022 | Shavit | A61M 1/0281 |

FOREIGN PATENT DOCUMENTS

| | | | | |
|---|---|---|---|---|
| EP | 1793103 A2 | 6/2007 | | |
| EP | 3260796 A1 | 12/2017 | | |
| EP | 3491252 A1 | 6/2019 | | |
| WO | WO-2018020457 A1 * | 2/2018 | ......... | A47L 15/4225 |

\* cited by examiner

PUMP COVER FOR A HOUSEHOLD APPLIANCE

CROSS-REFERENCE TO RELATED APPLICATIONS

This application claims priority to PCT International Application No. PCT/IB2021/052422 filed on Mar. 24, 2021, which application claims priority to Italian Patent Application No. 102020000006253 filed on Mar. 25, 2020, the entire disclosures of which are expressly incorporated herein by reference.

STATEMENT RE: FEDERALLY SPONSORED RESEARCH/DEVELOPMENT

Not Applicable

BACKGROUND

Field of the Invention

The present invention relates to the field of pumps for household appliances, for example for a dishwasher or a washing machine, for pumping a liquid, e.g. water.

In particular, the invention relates to a cover for a pump.

The cover is provided with an electric heating element apt to be wetted by the liquid, and with at least one component for controlling the temperature.

Background Art

A type of pump cover of a household appliance comprises an electric heater, in particular a sheathed resistor or tubular heater, apt to be wetted by the liquid to be heated.

The temperature of the liquid and of the heating element is controlled by means of electromechanical devices, for example by means of a thermostat and a thermal fuse.

The electromechanical devices are adequate to ensure the thermal management of the tubular heaters, especially in household appliances, e.g. a dishwasher, equipped with a medium-low level electronics.

Electromechanical devices cannot be associated or are difficult to associate, with more sophisticated electronic control units.

Moreover, electromechanical devices are rather cumbersome.

It would be useful to introduce electronic temperature control components for the tubular heaters because such electronic components could be associated with the other, even more sophisticated, electronic components with which the household appliance is provided. Moreover, electronic temperature control components would also be advantageous because they are smaller in size than the electromechanical devices.

The need is therefore felt for a pump cover of a household appliance provided with a tubular heater apt to be wetted by the liquid to be heated, and provided with one or more electronic temperature control components.

SUMMARY OF THE INVENTION

It is an object of the present invention to provide a pump cover provided with an electric heater apt to be wetted by the liquid to be heated in the pump, the cover being provided with one or more NTC thermistors to allow controlling the temperature.

In particular, it is an object of the present invention to avoid the excessive heating of the one or more NTC thermistors so as to avoid the damage thereof.

In particular, it is an object of the invention to allow the use of one or more NTC thermistors which are of the compact and affordable type.

It is another object of the invention to allow the disassembly of the one or more NTC thermistors so as to allow the replacement thereof if needed.

The present invention achieves at least one of such objects and other objects which will become apparent in light of the present description, by means of a cover for a pump for a liquid for a household appliance, in particular for a dishwasher or a washing machine;

the cover comprising
  a wall having an inner face destined to come into contact with the liquid and an outer face, opposite to the inner face;
  an electric heating element which crosses said wall, whereby said at least one electric heating element is apt to come into contact with the liquid;
  wherein said wall comprises at least one first portion where the inner face is spaced apart from the electric heating element, in particular where the inner face is spaced apart, or separate from, the electric heating element and is at the electric heating element;
  wherein said wall comprises at least one second portion where the inner face is in contact with the electric heating element;
  a support fixed to the outer face;
characterized in that
  the cover comprises at least a first NTC thermistor and a second NTC thermistor which are fixed to the outer face at said first portion of the wall;
  wherein the first NTC thermistor is distal from said second portion of the wall, and the second NTC thermistor is proximal to said second portion of the wall;
  wherein the first NTC thermistor and the second NTC thermistor are at a stretch of the heating element spaced apart from said first portion of the wall and facing said first portion of the wall;
  wherein the first NTC thermistor and the second NTC thermistor are fixed to the outer face by means of said support;
  wherein said support comprises a first part in contact with said first portion of the wall;
  wherein the first NTC thermistor and the second NTC thermistor are fixed to said first part of the support;
  wherein said first part of the support comprises a first zone and a second zone, between which at least one notch is provided, in particular to limit the transmission of heat between the first zone and the second zone of said first part of the support;
  wherein said first NTC thermistor is fixed to the first zone and the second NTC thermistor is fixed to the second zone.

The invention also relates to a pump according to claim 13.

Advantageously, the cover of the invention allows increasing the accuracy and the information which can be obtained by means for detecting the temperature, both during regular operation and during anomalous operation, in a pump cover provided with a heating element apt to be arranged in the body of the pump, i.e. arranged so as to be wetted by the liquid.

Advantageously, the cover of the invention allows using NTC thermistors, avoiding damage due to high temperatures and increasing the accuracy and the information which can be obtained by the NTC thermistors both during regular operation and during anomalous operation.

Advantageously, both NTC thermistors are cooled by the liquid in the pump so they are not damaged by the heat during regular operation.

During regular operation, one NTC thermistor is particularly sensitive to the temperature of the heating element, while the other NTC thermistor is particularly sensitive to the temperature of the liquid, in particular by virtue of the specific positioning thereof and by virtue of the aforesaid notch. The thermal gap, in particular the thermal insulation, provided by the notch allows the difference between the temperature detected by the two NTC thermistors to be increased. Such a difference in temperature provides useful information on the operation both under normal conditions and under anomalous conditions (e.g. dry operation).

Note that the notch also allows arranging both NTC thermistors on the same support so as to facilitate the assembly and disassembly operations, in any case allowing one NTC thermistor to be particularly sensitive to the temperature of the heating element and the other NTC thermistor to be particularly sensitive to the temperature of the liquid.

In case of dry operation, both NTC thermistors advantageously are sensitive to the temperature of the heating element by virtue of the specific positioning thereof.

Advantageously, the cover of the invention allows the heat profile of the heating element to be controlled, as well as the correct achievement of the temperatures required to execute cleaning cycles to be ensured.

In particular, the cover allows a quick detection of the temperature and a quick intervention of the electronic control unit to which the two or more NTC thermistors may be connected.

Moreover, the two or more NTC thermistors allow increased information concerning the operation and/or malfunctioning of the heating element to be obtained, such as for example, poor heat exchange during circumstances of limescale or dirt accumulation.

As mentioned above, two or more NTC thermistors may be provided.

Preferably, two NTC thermistors are provided, for example only two NTC thermistors.

Advantageously, the two or more NTC thermistors are at said first portion of the wall, which the inner face of which may be wetted by the liquid, in particular so as to avoid the NTC thermistors from being excessively heated by the heating element, and therefore so as to avoid the damage thereof. Indeed, the liquid cools the portion of wall which is wetted.

In particular, the cover is preferably configured so that the two or more NTC thermistors are subject to a temperature which is less than 130° C., preferably less than 100° C.

Preferably, the two or more NTC thermistors are in the vicinity, but not at, the second portion of wall, i.e. in the vicinity of, but not at, the stretch of heating element in contact with the inner face.

In other words, the entire first NTC thermistor is at the first portion of wall, and the entire second NTC thermistor is at the first portion of wall.

Preferably, one NTC thermistor is closer to the portion of wall which is in contact with the heating element than the other NTC thermistor.

Advantageously, therefore, one NTC thermistor is more sensitive to the temperature of the liquid, while the other NTC thermistor is more sensitive to the temperature of the heating element.

Advantageously, the two or more NTC thermistors are at, in particular above, the stretch of heating element spaced apart from the inner face and facing the inner face.

Advantageously, the one or more NTC thermistors may thus better perceive the heat generated by the heating element in case of dry operations, in particular when there is no liquid wetting the wall of the cover.

Preferably, the entire first NTC thermistor is at, preferably above, said stretch of heating element, and the entire second NTC thermistor is at, in particular above, said stretch of heating element.

Advantageously, the NTC thermistors are fixed to a support.

Preferably, such a support is arranged partly above the first portion of wall and partly above the second portion of wall.

Preferably, the support is fixed to the wall by means of fastening means which allow the disassembly thereof from the wall, or more generally from the cover, whereby the support and the one or more NTC thermistors may be easily replaced.

The support is made of thermally conductive material, preferably of metal, e.g. aluminum or aluminum alloy.

The support in particular is provided with one or more electrically conductive tracks, in particular metal tracks, to which the one or more NTC thermistors are welded.

A layer of dielectric material is provided between said one or more conductive tracks and the support.

Preferably, an electric connector is fixed to the support and is connected to said one or more conductive tracks.

Preferably, a pre-assembled electronic component comprising the support and the two or more NTC thermistors, the one or more conductive tracks, and preferably also the electric connector, is provided. Alternatively, the electric connector may also be far from the support, in particular from the one or more conductive tracks, and be connected to said one or more conductive tracks by means of a wired connection.

Advantageously, the support is provided with one or more notches (or cuts). Each notch in particular is an empty space.

For example, when a notch is provided between two zones of the support, one NTC thermistor is fixed to a first zone and another NTC thermistor is fixed to a second zone.

Advantageously, one NTC thermistor is thus more sensitive to the temperature of the liquid and the other NTC thermistor is more sensitive to the temperature of the heating element because the notch limits the transmission of heat.

The one or more notches allow a difference in temperature to be obtained between the two NTC thermistors. The difference in temperature is information which can be used by an electronic control unit to manage heating the heating element.

Preferably, the notch is below the electric connector so that the welds of the legs of the connector, and the structure thereof, compensate for any structural weakening due to the opening of the notch.

The support may be sized according to the operating needs.

By mere way of example, the two NTC thermistors may be connected to an electronic control unit configured with a control logic which takes into consideration the absolute temperature of the two NTC thermistors, the gradient taken on during the operation of the element and the difference in temperature between the two NTC thermistors. Thereby, slow transients during regular operations, fast transients in the absence of heat exchange, and damage to/malfunctioning of the NTC thermistors themselves, may be registered.

When it is specified in the present description that an element is at another element, it means that the two elements are crossed by the same axis which is perpendicular to the aforesaid wall of the cover, in particular perpendicular to the surface of greatest extension of the aforesaid wall, which preferably is substantially flat.

Further features and advantages of the invention will become more apparent in light of the detailed description of non-exclusive embodiments.

The dependent claims describe particular embodiments of the invention.

BRIEF DESCRIPTION OF THE DRAWINGS

In the description of the invention, reference is made to the accompanying drawings, which are provided by way of non-limiting example, in which.

The same elements, or functionally equivalent elements, have the same reference numeral.

DESCRIPTION OF EXAMPLE EMBODIMENTS OF THE INVENTION

With reference to the drawings, example embodiments of a cover 1 according to the invention and of a pump 101 (FIG. 9) comprising cover 1, are described.

Figure 9:
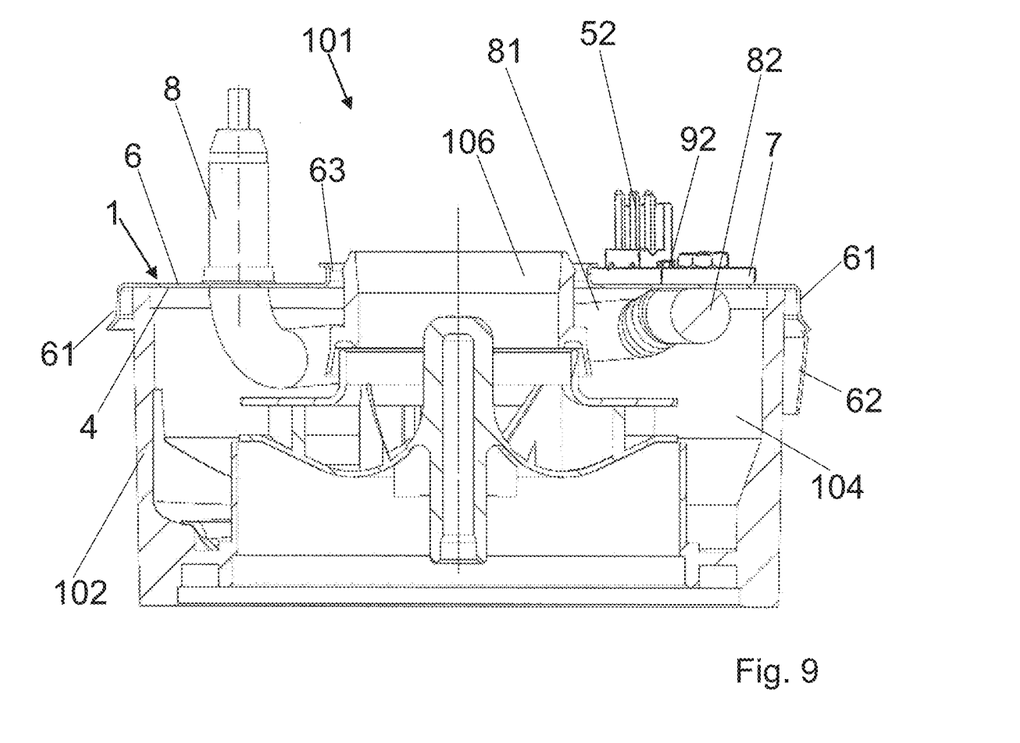
FIG. 9 shows a sectional view of a pump according to the invention.

Pump 101 in particular is a centrifugal pump or recirculation pump.

Cover 1 is configured to be fixed to a body 102 of pump 101, for example a body which delimits, in particular laterally, a chamber 104 for pumping a liquid. Once fixed to body 102, also the cover 1 delimits the pumping chamber 104, acting as closing element.

It in particular is a cover 1 of a pump 101 used in household appliances, such as for example, a dishwasher or a washing machine.

This type of pump is typically, but not exclusively, apt to pump water.

Cover 1 comprises a wall 2 which has an inner face 4, or lower face, and an outer face 6, or upper face.

The inner face 4 is destined to come into contact with the liquid, i.e. it is apt to be wetted by the liquid, in particular when cover 1 is fixed to the body 102 of pump 101. In other words, the inner face 4 is a face inside pump 101.

The outer face 6 is opposite to the inner face 4 and is a face outside pump 101, i.e. it is not destined to come into contact with the liquid.

Cover 1, wall 2 in particular, is preferably made of metal, e.g. steel, preferably stainless steel.

Cover 1 is preferably generally circular in shape, although it may have other shapes.

Figure 1:
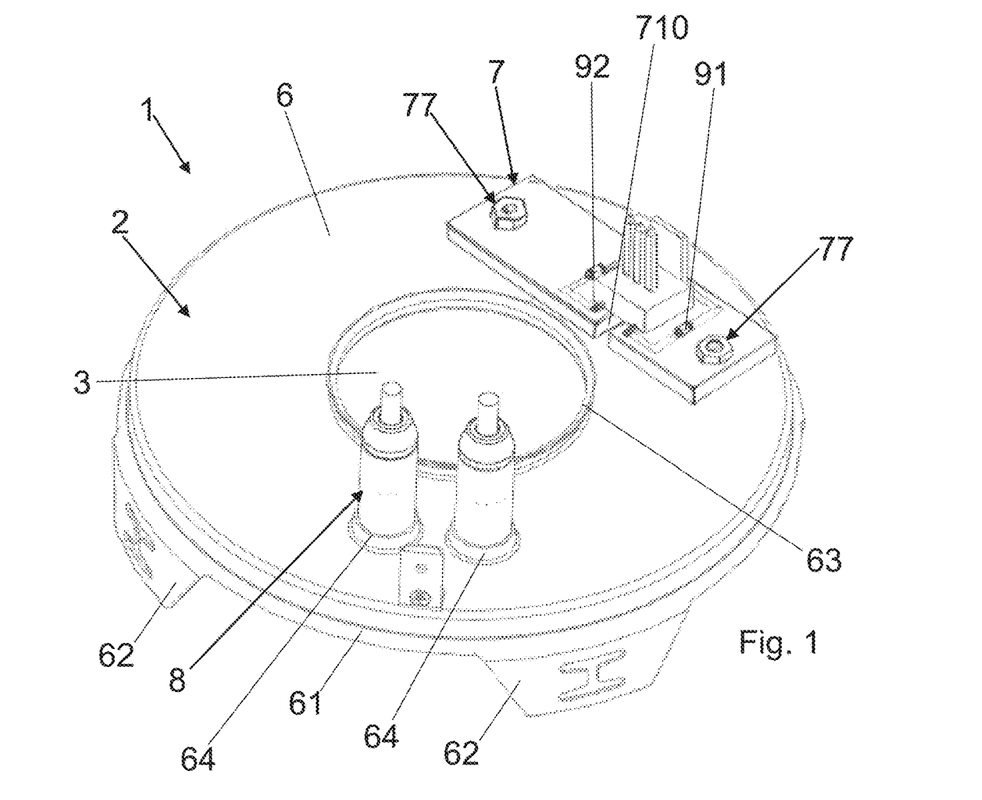
FIG. 1 shows a perspective view of a cover according to the invention.
Figure 2:
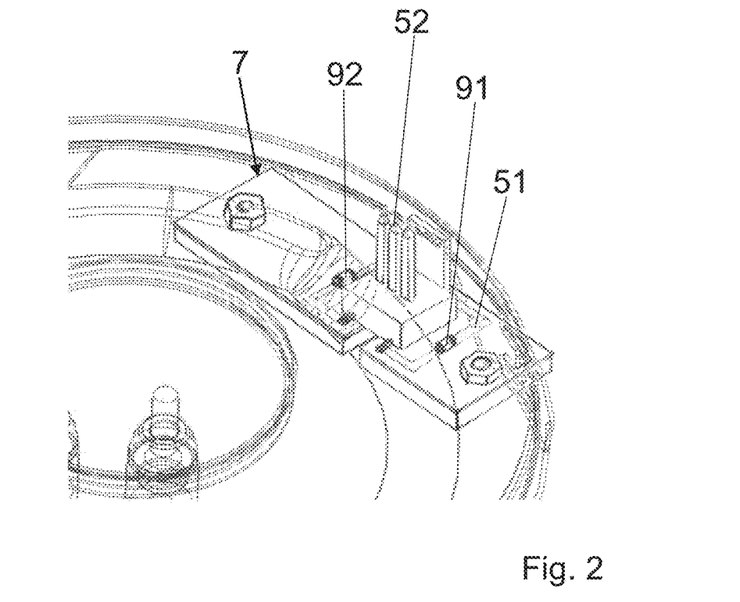
FIG. 2 shows a detail of the cover in FIG. 1, with a transparency view of certain parts for illustrative purposes.

Cover 1 is preferably provided with an opening 3 (FIG. 1, in particular), in particular an opening of wall 2 apt to be crossed by a duct 106 of pump 101, for example an inlet duct of the liquid, when cover 1 is fixed to body 102. Preferably, opening 3 is circular. Opening 3 is preferably provided in a central zone of cover 1.

Preferably, a shoulder 63 or collar (FIGS. 1 and 9, in particular) which delimits opening 3 is provided. Shoulder 63 extends from the upper face 6. Shoulder 63 in particular extends outwards (i.e. upwards).

Preferably, a skirt 61, or side wall, extends downwards from the outline of wall 2. Cover 1 is preferably provided with a plurality of flaps 62, for example three or four flaps, which are spaced apart from one another. The flaps 62 in particular extend downwards from skirt 61.

The flaps 62 serve to fix the cover 1 to body 102, or to another element, of pump 101.

Cover 1 comprises a heating element 8, in particular an electric heating element 8. Preferably, the electric heating element 8 comprises a metal outer casing, for example made of stainless steel, in which at least one resistor is provided.

The electric heating element 8 is apt to generate heat due to the Joule effect, i.e. when it is crossed by an electric current.

The electric heating element 8 is tubular and in particular, is a sheathed resistor.

Preferably, but not exclusively, the outer surface of the casing, which is the outermost part of the heating element 8, has a substantially circular section.

Figure 3:
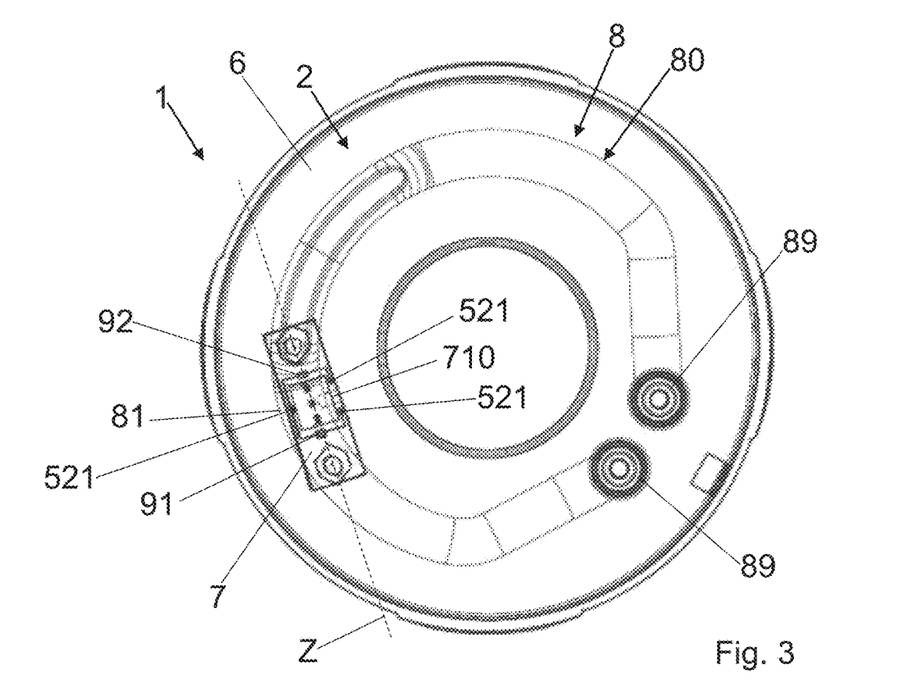
FIG. 3 shows a top plan view of the cover in FIG. 1, with a transparency view of certain parts for illustrative purposes.
Figure 7:
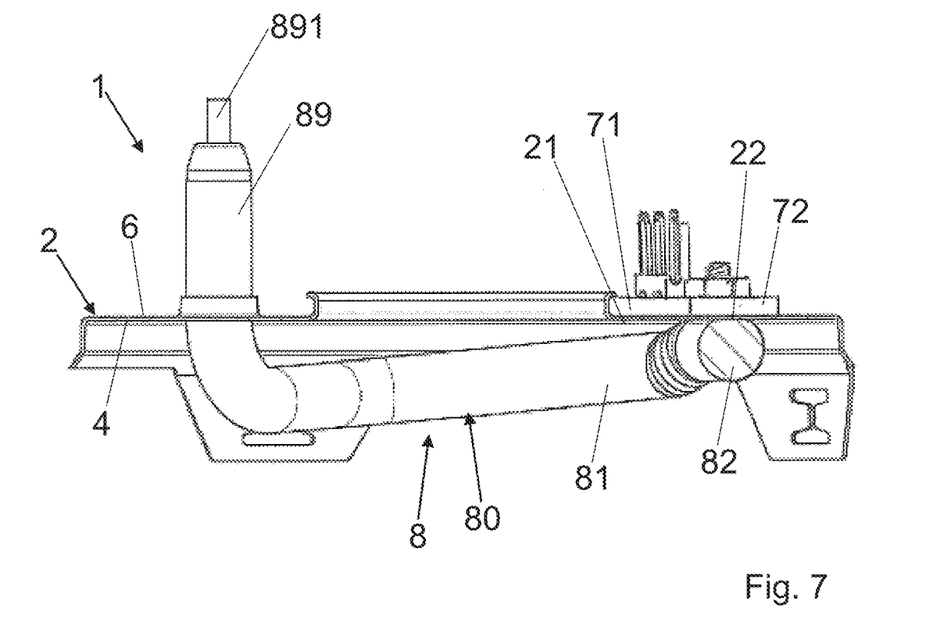
FIG. 7 shows a sectional view of the cover in FIG. 1.
Figure 8:
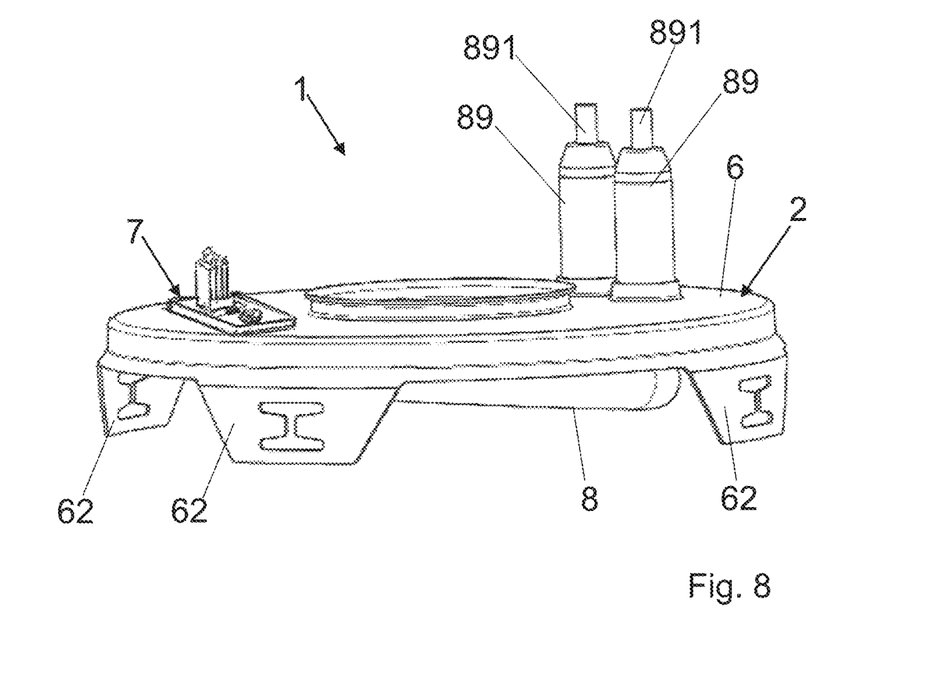
FIG. 8 shows another perspective view of the cover in FIG. 1.

The heating element 8 comprises a heating stretch 80 (FIGS. 3 and 7, in particular) and two end stretches 89 connected to the heating stretch 80. Each end stretch 89 comprises a respective pin 891 for electrically feeding the heating element 8.

The heating element 8 serves to heat the liquid inside pump 101, in particular inside chamber 104.

Preferably, but not exclusively, a single heating element 8 is provided. Preferably, but not necessarily, the liquid is heated exclusively by means of the heating element 8.

The heating element 8 crosses cover 1, in particular wall 2, and is fixed thereto.

In other words, the heating element 8 crosses the entire thickness of wall 2.

More in detail, the arrangement of the heating element 8 with respect to wall 2 is such that the end stretches 89 are above wall 2 and the heating stretch 80 is below wall 2.

The end stretches 89 in particular protrude from the upper, or outer, side which is the side comprising the outer face 6. Therefore, the end stretches 89 are apt to be outside pump 101.

Instead, the heating stretch 80 is apt to be wetted by the liquid (or substantially submerged in the liquid), in particular during the operation of pump 101.

Indeed, when cover 1 is restrained to pump 101, the heating stretch 80 is inside pump 101, in particular inside the space 104 (or the pumping chamber) delimited by the body 102 of pump 101.

To ensure the heating element 8 crosses cover 1, wall 2 is provided with two holes crossed by the heating element 8. More in detail, the end stretches 89 are sealingly fixed to the inner edge of the respective hole. The fixing occurs by means of fastening means, preferably by means of welding or brazing. Preferably, a respective shoulder or collar 64 (FIG. 1, in particular) fixed to a respective end stretch 89 extends outwards (i.e. upwards) from the contour of each hole to facilitate such a fixing. The holes are obstructed due to the tight fixing. Therefore, the liquid does not undesirably come out of the pumping chamber 104.

Figure 5:
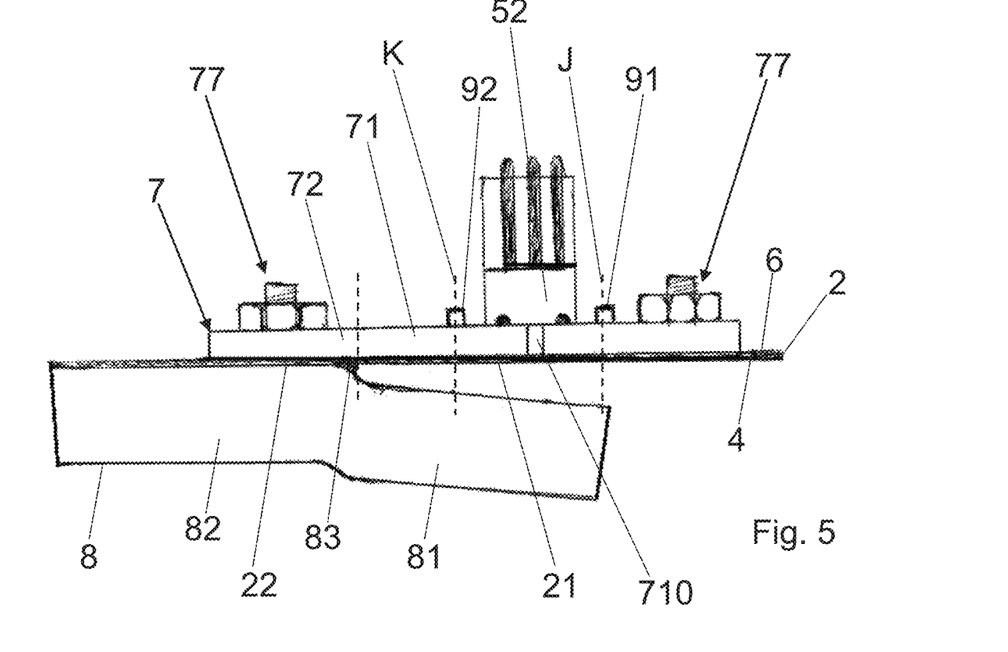
FIG. 5 diagrammatically shows a section of a part of the cover according to the invention.
Figure 6:
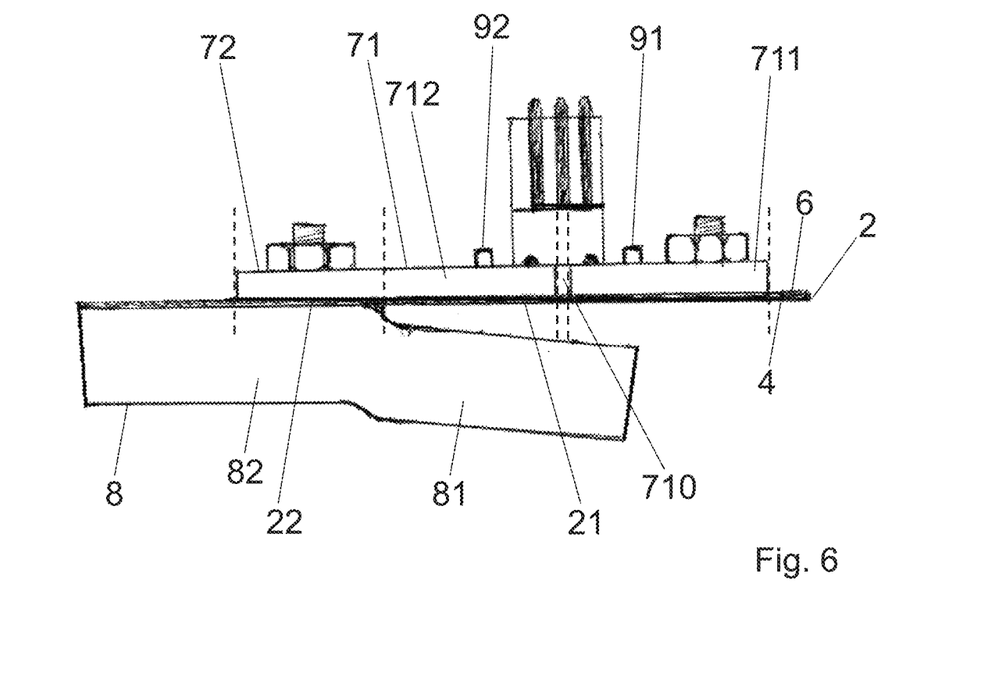
FIG. 6 is substantially equal to FIG. 5, with respect to which there are other remarks.

With particular reference to FIGS. 5 and 6, wall 2 comprises at least one first portion 21 spaced apart from the heating element 8.

In particular, wall 2 comprises at least one first portion 21 where the inner face 4 is spaced apart from the electric heating element 8 and, in particular, part of portion 21 faces the heating element 8. More particularly, the inner face of the first portion 21 of wall 2 (which is a part of the inner face 4) is spaced apart from the heating element 8.

Moreover, wall 2 comprises at least one second portion 22 in contact, preferably directly in contact, with the heating element 8, in particular with the metal casing of the heating element 8.

More particularly, wall 2 comprises at least one second portion 22 where the inner face 4 is in contact with the electric heating element 8. More particularly, the inner face of the second portion 22 of wall 2 (which is a part of the inner face 4) is in contact with the heating element 8.

Therefore, the heating element 8, in particular the heating stretch 80 thereof, has at least one portion or stretch 81 spaced apart, in particular separate, from the inner face 4, i.e. not in contact with the inner face 4, and at least one portion or stretch 82 in contact with the inner face 4.

Preferably, the surface extension of portion 22 is less than, in particular much less than, the surface extension of portion 21.

Preferably, an empty space, which in particular may be filled by the liquid in pump 101, is between stretch 81 and the inner face 4.

Preferably, but not exclusively, there is provided a single stretch 82 of the heating element 8 to be in contact with the inner face 4 of wall 2. That is, a single portion 22 of wall 2 is in contact with the heating element 8.

The remaining part of the heating stretch 80, in particular stretch 81, is spaced apart from the inner face 4.

Stretch 82 is preferably fixed to the inner face 4 by means of welding or brazing, in this latter case using filler material 83, in particular a suitable heat conducting material.

The heating stretch 80 defines an axis, preferably substantially curvilinear.

It is preferable that stretch 81 is longer than the length of stretch 82 of the heating element 8, in particular along said axis defined by the heating stretch 80.

Cover 1 further comprises at least two NTC (Negative Temperature Coefficient) thermistors 91, 92. NTC thermistors are in themselves known. An NTC thermistor in particular is a resistor which resistance value decreases as the temperature increases. An NTC thermistor in particular is not an electro-mechanical component.

Said at least two NTC thermistors 91, 92 preferably are of the NTC-SMD (Surface-Mount Device) type.

Preferably, two NTC (preferably NTC-SMD) thermistors 91, 92 are provided, in particular only two NTC thermistors, although more than two NTC thermistors may be provided.

The NTC thermistors 91, 92 are fixed to wall 2, in particular to the outer face 6.

The NTC thermistors 91, 92 in particular are apt to act as temperature sensors.

The NTC thermistors 91, 92 are at, in particular above, the aforesaid first portion 21 of wall 2. As mentioned above, the inner face of the first portion 21 is destined to be wetted by the liquid which is inside pump 101.

Therefore, in other words, the NTC thermistors 91, 92 are fixed to a portion 21 of wall 2 which inner face may be wetted by the liquid in pump 101.

Advantageously, a first NTC thermistor 91 is distal from the aforesaid second portion 22 of wall 2, and a second NTC thermistor 92 is proximal to said second portion 22 of wall 2. In other words, the NTC thermistor 91 is farther away from the second portion 22, and therefore farther away from stretch 82; and the NTC thermistor 92 is closer to the second portion 22, and therefore closer to stretch 82.

Therefore, the NTC thermistor 91 is more sensitive to the temperature of the liquid, while thermistor 92 is more sensitive to the temperature of the heating element 8.

Preferably, the NTC thermistor 91 is apt to be sensitive substantially to the temperature of the liquid, and the NTC thermistor 92 is apt to be sensitive substantially to the temperature of the heating element 8.

Preferably, the NTC thermistor 91 is at a distance which is from 15 to 25 mm from portion 22 and/or the NTC thermistor 92 is at a distance from 5 to 15 mm from portion 22.

Advantageously, the NTC thermistor 91 and the NTC thermistor 92 are at, in particular above, the heating element 8, in particular of stretch 81 of the heating element 8. As mentioned above, stretch 81 is spaced apart from the inner face 4 of wall 2, and in particular faces the inner face 4.

More particularly, the NTC thermistor 91 is at portion 21 and also at the heating element 8 according to a first axis J which perpendicularly crosses wall 2. In other words, the NTC thermistor 91, portion 21 and also the heating element 8, in particular stretch 81, are crossed by the same first axis J which perpendicularly crosses wall 2.

Moreover, the NTC thermistor 92 is at portion 21 and also at the heating element 8 according to a second axis K which perpendicularly crosses wall 2. In other words, the NTC thermistor 92, portion 21 and also the heating element 8, in particular stretch 81, are crossed by the same second axis K which perpendicularly crosses wall 2.

The aforesaid first axis J and second axis K are different from each other, and in particular are parallel to each other, and in particular are rectilinear axes.

In particular, the axes J and K are parallel to the axis about which the opening 3 of wall 2 extends.

Preferably, axis J is the central axis of the NTC thermistor 91 and axis K is the central axis of the NTC thermistor 92.

The NTC thermistors 91, 92 preferably are not at, in particular are not above, stretch 82. More in detail, the NTC thermistors 91, 92 preferably are not even partially at, in particular are not even partially above, stretch 82.

Cover 1 advantageously comprises a support 7 fixed to the outer face 6. The NTC thermistor 91 and the NTC thermistor 92 are fixed to the outer face 6 by means of said support 7. In particular, support 7 is between the outer face 6 and the NTC thermistors 91, 92.

Support 7 is made of thermally conductive material, preferably of metal, e.g. aluminum or aluminum alloy.

Preferably, a thermally conductive means, or thermally conductive paste or thermally conductive pad, preferably soft, is between support 7 and the outer face 6 in order to promote the thermal contact between support 7 and wall 2.

Preferably, support 7 has a thickness from 0.5 to 1.5 mm. Said thickness is measured in particular, along an axis which perpendicularly crosses wall 2.

Preferably, support 7 substantially is a plate, for example substantially rectangular-shaped.

Support 7 comprises a first part 71 in contact with said first portion 21 of wall 2, in particular with the outer face of the first portion 21. The first part 71 is at, in particular above, the first portion 21 of wall 2. Preferably, the first part 71 is also at least partially at, in particular above, stretch 81 of the heating element 8.

The NTC thermistors 91, 92 are fixed to said first part 71 of support 7.

Preferably, support 7 comprises a second part 72 in contact with said second portion 22 of wall 2, in particular with the outer face of the second portion 22.

The second part 72 is at, in particular above, the second portion 22 of wall 2. In particular, the second part 72 is also at least partially at, in particular above, stretch 82 of the heating element 8.

The first part 71 and the second part 72 preferably are adjacent to each other.

Preferably, support 7 defines an axis Z (FIG. 3), in particular a longitudinal axis. Preferably, said axis Z is at, in particular is aligned with, part of stretch 81 of the heating element 8. Preferably, the NTC thermistor 91 and the NTC thermistor 92 are aligned with each other along said axis Z.

Advantageously, the reading speed of the dry condition is thus further increased.

Preferably, support 7 is provided with at least one notch 710, e.g. one notch 710. Notch 710 substantially is an empty space.

Notch 710 is provided between two zones 711, 712 (FIG. 6) of the first part 71. The two zones 711, 712 are joined to each other by a connecting portion of support 7.

Preferably, notch 710 is at least partially at, in particular above, said stretch 81.

Notch 710 serves in particular to limit the transmission of heat between zone 711 and zone 712 of said first part 71 of support 7.

Advantageously, the NTC thermistor 91 is fixed to zone 711 and the NTC thermistor 92 is fixed to zone 712.

Advantageously, the NTC thermistor 91 is thus particularly sensitive to the temperature of the liquid, while the NTC thermistor 92 is particularly sensitive to the temperature of the heating element 8.

In particular, the NTC thermistor 91 advantageously is apt to detect a temperature which conforms more with the temperature of the water during the regular operation of pump 101, while the NTC thermistor 92 is closer to the hot zone and therefore is more reactive in case of lack of water because it is more sensitive to the temperature of the heating element 8. In particular, as the NTC thermistor 91 and the NTC thermistor 92 are at stretch 81, in case of lack of water, both the NTC thermistor 91 and the NTC thermistor 92 read the increase of the temperature due to the superheating of the heating element 8.

Notch 710 advantageously allows the difference in temperature between the NTC thermistor 91 and the NTC thermistor 92 to be adjusted and allows the NTC thermistor 92 to be substantially at the same temperature as the water.

Zone 711 of the first part 71 of support 7 is distal from the second part 72 of support 7.

Zone 712 of the first part 71 of support 7 is proximal, in particular adjacent, to the second part 72 of support 7.

Preferably, notch 710 has a thickness equal to the thickness of support 7.

Preferably, notch 710 is obtained starting from a portion of the periphery of support 7.

The width and the depth (or length) of notch 710 may be selected according to the operating needs.

Preferably, notch 710 is between the first NTC thermistor 91 and the second NTC thermistor 92, i.e. preferably notch 710 extends between the first NTC thermistor 91 and the second NTC thermistor 92.

Figure 4:
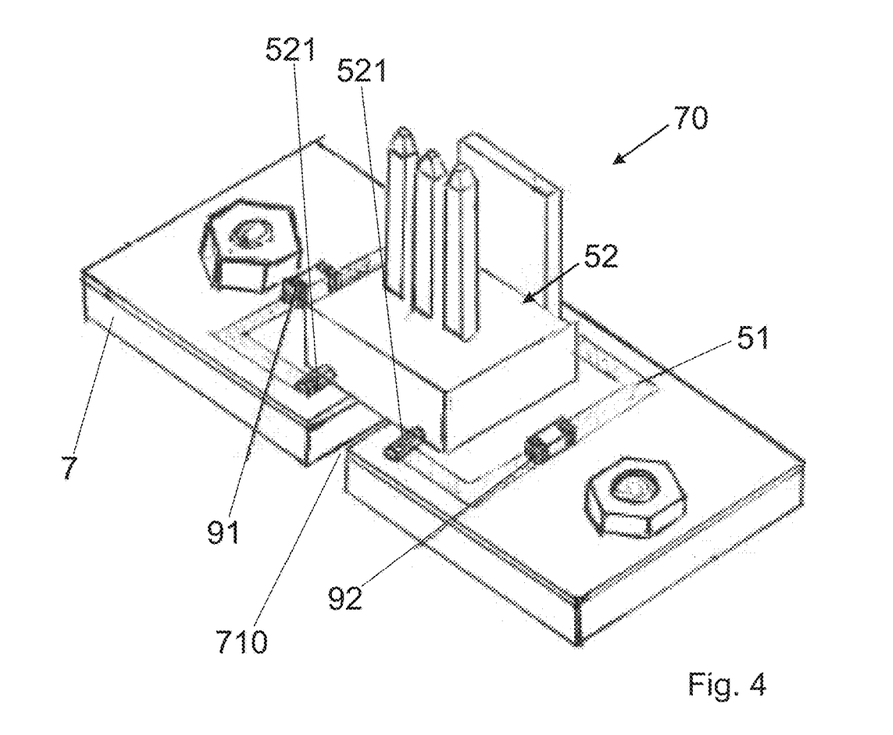
FIG. 4 shows a perspective view of a component of the cover in FIG. 1.
Figure 10:
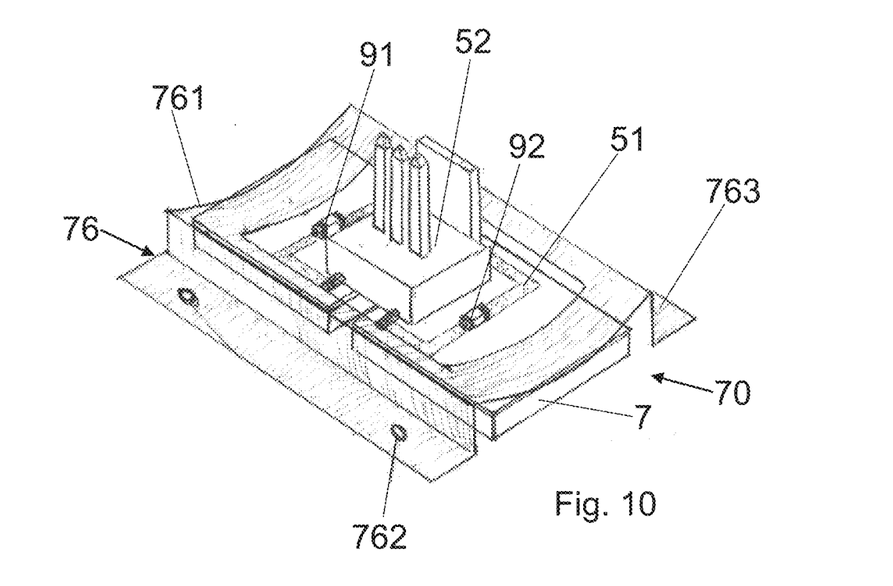
FIG. 10 shows a variant of a component of the cover according to the invention.

Support 7 is provided with at least one electrically conductive track 51 fixed thereto, e.g. one conductive track 51 (FIGS. 4 and 10).

The NTC thermistors 91, 92 are fixed to the electrically conductive track 51, in particular so as to be crossed by an electrical signal with which an ohmic and therefore temperature value may be associated, therethrough.

A dielectric layer is provided between the electrically conductive track 51 and support 7.

An electric connector 52, preferably multipolar, is also fixed to support 7. For example, the electric connector 52 is three-pole (as shown in the drawings) and in particular, is provided with three electrically conductive legs 521 (FIGS. 3 and 4) welded to the conductive track 51.

The electric connector 52 is apt to receive an electrical signal processed by the NTC thermistors 91, 92 by means of the conductive track 51.

Preferably, the electric connector 52 is partially arranged at said notch 710, is partially fixed to said first zone 711 of said first part 71 of support 7, and is partially fixed to said second zone 712 of said first part 71 of support 7.

In other words, the electric connector 52 substantially serves as bridge between the first zone 711 and the second zone 712 so as to provide a structural support to compensate for any structural weaknesses induced by the presence of notch 710.

Preferably, the electric connector 52 is only partly above notch 710.

The component 70 (FIGS. 4 and 10) comprising the support 7, the NTC thermistors 91, 92, the electrically conductive track 51 and preferably also the electric connector 52, substantially is an electronic board which in particular, is a pre-assembled component.

Preferably, support 7 is fixed to wall 2 so as to be disassembled from wall 2, in particular so as to be disassembled without damaging components of cover 1.

For example, as shown in FIGS. 1 to 9, support 7 is fixed to wall 2 by means of fastening means 77 which provide a screw coupling, for example of the nut and stud type, the stud being fixed to wall 2, preferably welded to wall 2. Preferably, first fastening means 77, for example a first nut-stud pair 77, are fixed to portion 22, in particular at stretch 82 of the heating element 8, and second fastening means 77, for example a second nut-stud pair 77, are fixed to portion 21, in particular at stretch 81 of the heating element 8.

In the variant shown in FIG. 10, the fastening means comprise an elastic body 76 which applies a force on support 7 to fix it to wall 2.

In particular, the elastic body 76 comprises two flaps 762, 763 between which a central part 761 is provided. The flaps 762, 763 are fixed, e.g. welded, to wall 2 so as to bend the middle part 761 so that it applies a force on support 7.

Additionally or alternatively to the aforesaid fastening means 76, 77, support 7 may also be welded or brazed to wall 2 or fixed by means of an adhesive.

In addition to the NTC thermistors 91, 92, cover 1 may in any case be provided with one or more temperature control devices of the electro-mechanical type. For example, cover 1 may be provided with a thermostat, in particular of the electro-mechanical and/or thermal fuse type.

Said thermostat and/or thermal fuse in particular are fixed to the outer face 6.

In all the embodiments, cover 1, in addition to the NTC thermistors 91, 92 and the possible one or more temperature control devices of the electro-mechanical type, may also be provided with one or more further NTC thermistors fixed to the outer face 6 in different positions with respect to the NTC thermistors 91, 92.

The invention claimed is:

1. A cover for a pump for a liquid for a household appliance, in particular for a dishwasher or a washing machine;
    the cover comprising
        a wall having
            an inner face destined to come into contact with the liquid and
            an outer face, opposite to the inner face;
        an electric heating element which crosses said wall, whereby said at least one electric heating element is apt to come into contact with the liquid;
            wherein said wall comprises at least one first portion where the inner face is spaced apart from the electric heating element;
            wherein said wall comprises at least one second portion, where the inner face is in contact with the electric heating element;
            a support fixed to the outer face;
        wherein
            the cover further comprises at least a first NTC thermistor and a second NTC thermistor which are fixed to the outer face at said first portion of the wall;
            wherein the first NTC thermistor is distal from said second portion of the wall, and the second NTC thermistor is proximal to said second portion of the wall;
            wherein the first NTC thermistor and the second NTC thermistor are at a stretch of the heating element spaced apart from said first portion of the wall and facing said first portion of the wall;
            wherein the first NTC thermistor and the second NTC thermistor are fixed to the outer face by means of said support;
            wherein said support comprises a first part in contact with said first portion of the wall;
            wherein the first NTC thermistor and the second NTC thermistor are fixed to said first part of the support;
            wherein said first part of the support comprises a first zone and a second zone, between which at least one notch is provided, in particular to limit the transmission of heat between the first zone and the second zone of said first part of the support;
            wherein the first NTC thermistor is fixed to the first zone and the second NTC thermistor is fixed to the second zone.

2. The cover according to claim 1, wherein the first NTC thermistor and the second NTC thermistor are above said stretch.

3. The cover according to claim 1, wherein said support comprises a second part in contact with said second portion of the wall.

4. The cover according to claim 3, wherein said first zone of the first part of the support is distal from the second part of the support, and wherein said second zone of the first part of the support is proximal to the second part of the support.

5. The cover according to claim 1, wherein said support is provided with at least one electrically conductive track; and wherein the first NTC thermistor and the second NTC thermistor are fixed to said at least one electrically conductive track.

6. The cover according to claim 5, wherein said support is made of metal, and wherein a dielectric layer is provided between said at least one electrically conductive track and said support.

7. The cover according to claim 1, wherein said support is fixed to the wall so as to be disassembled from the wall.

8. The cover 4 according to claim 1, wherein said support is fixed to the wall by fastening means which provide a coupling by screwing and/or by fastening means which comprise at least one elastic body and/or by welding or brazing and/or by an adhesive.

9. The cover according claim 1, wherein an electric connector fixed to the support is provided.

10. The cover according to claim 9, wherein said electric connector is partially arranged at said notch, is partially fixed to said first zone of said first part of the support, and is partially fixed to said second zone of said first part of the support.

11. The cover according to claim 1, wherein said support defines an axis, in particular a longitudinal axis, and wherein said axis is at, in particular is aligned with, part of the stretch of the heating element spaced apart from said first portion of the wall and facing said first portion of the wall.

12. The cover according to claim 1, wherein said at least one notch is at least partially at, in particular above, said stretch.

13. A pump for a household appliance, comprising a cover according to claim 1.

* * * * *